United States Patent [19]

Hammond et al.

[11] 4,251,380

[45] Feb. 17, 1981

[54] QUATERNARY AMMONIUM DIESTER SALT COMPOSITION AND HYDROCARBON OIL CONTAINING SAME

[75] Inventors: Kenneth G. Hammond; Harry Chafetz, both of Poughkeepsie, N.Y.

[73] Assignee: Texaco Inc., White Plains, N.Y.

[21] Appl. No.: 53,010

[22] Filed: Jun. 28, 1979

[51] Int. Cl.³ .............................................. C10M 1/32
[52] U.S. Cl. .................... 252/34; 252/33; 252/49.6; 252/51.5 A; 252/56 D; 546/1; 546/13; 546/255
[58] Field of Search .................. 252/34, 51.5 A, 56 D, 252/33, 49.6; 260/567.6 R, 567.6 H; 546/1, 13, 255

[56] References Cited

U.S. PATENT DOCUMENTS

| | | | |
|---|---|---|---|
| 2,313,392 | 3/1943 | Miller | 546/1 X |
| 2,830,021 | 4/1958 | Smith et al. | 252/34 |
| 3,485,755 | 12/1969 | Grimm et al. | 252/34 X |
| 3,522,179 | 7/1970 | Le Suer | 252/51.5 A |
| 3,560,507 | 2/1971 | Wakeman et al. | 546/255 X |
| 3,778,371 | 12/1973 | Malec | 252/34 |
| 3,950,341 | 4/1976 | Okamoto et al. | 252/34 X |

*Primary Examiner*—Andrew Metz
*Attorney, Agent, or Firm*—Carl G. Ries; Robert A. Kulason; James J. O'Loughlin

[57] ABSTRACT

A quaternary ammonium salt of a diester represented by the formula:

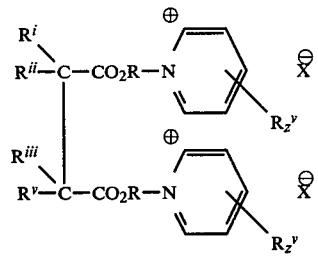

in which $R^i$, $R^{ii}$, $R^{iii}$ and $R^{iv}$ represent hydrogen, alkyl or alkenyl radicals at least one of which is a hydrocarbyl radical having from 50–200 carbon atoms, R is a divalent radical having from 2–10 carbon, or carbon and oxygen atoms, $R^v$ is hydrogen or a hydrocarbyl radical, z has a value from 0–4 and X is an anion is provided, as well as a method of preparation and a hydrocarbon lubricating oil composition containing same.

33 Claims, No Drawings

QUATERNARY AMMONIUM DIESTER SALT COMPOSITION AND HYDROCARBON OIL CONTAINING SAME

BACKGROUND OF THE INVENTION

1. Field of the Invention

Internal combustion engines operate under a wide range of temperatures including low-temperature stop-and-go service as well as high temperature conditions produced by continuous high speed driving. Stop-and-go driving, particularly during cold, damp weather conditions, leads to the formation of a sludge in the crankcase and oil passages of a gasoline engine. This sludge seriously limits the ability of the crankcase oil to lubricate the engine. In addition, the sludge tends to contribute to rust formation within the engine. The noted problems are compounded by lubrication service maintenance recommendations calling for extended oil drain intervals.

It is known to employ nitrogen-containing dispersants and/or detergents in the formulation of crankcase lubricating oil compositions. Many of the known dispersant/ detergent compounds are based on the reaction of an alkenylsuccinic acid or anhydride with an amine or polyamine to produce an alkylsuccinimide or an alkenylsuccinamic acid as determined by selected conditions of reaction.

It is also known to chlorinate alkenylsuccinic acid or anhydride prior to the reaction with an amine or polyamine in order to produce a reaction product in which a portion of the amine or polyamine is attached directly to the alkenyl radical of the alkenylsuccinic acid or anhydride. The thrust of many of these processes is to produce a dispersant having a relatively high level of nitrogen. The noted known processes generally result in the production of a dispersant reaction product typically containing from about 0.5 to 5% nitrogen. These dispersant additives exhibited a high degree of oil solubility and have been found to be effective for dispersing the sludge that is formed under severe low temperaure stop-and-go engine operating conditions. However, it has become increasingly difficult to formulate lubricants with these additives which meet the present requirements with respect to the prevention or inhibition of the formation of varnish.

2. Description of the Prior Art

U.S. Pat. No. 3,522,179 discloses esters of hydrocarbonsubstituted succinic acid which are prepared by reacting a chlorinated polyolefin with maleic anhydride to form an intermediate hydrocarbon-substituted succinic anhydride and then reacting the intermediate with a glycol, such as neopentyl glycol, or polyethylene glycol to form an acid ester.

U.S. Pat. No. 3,778,371 discloses lubricant and fuel compositions containing N-hydrocarbyl-substituted quaternary ammonium salts prepared by reacting a high molecular weight aliphatic hydrocarbon halide with a tertiary amine.

SUMMARY OF THE INVENTION

The quaternary ammonium diester salt of this invention is represented by the formula:

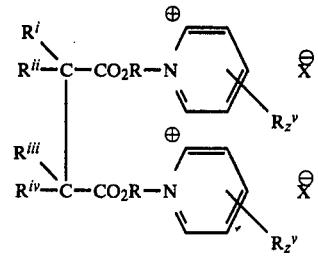

in which $R^i$, $R^{ii}$, $R_{iii}$ and $R^{iv}$ represent hydrogen, alkyl or alkenyl radicals at least one of which is a hydrocarbyl radical having from 50-200 carbon atoms, R is a divalent radical having from 2-10 carbon, or carbon and oxygen atoms, $R^v$ is hydrogen or a hydrocarbyl radical, Z has a valve from 0-4 and X is an anion selected from the group consisting of halides, sulfates, carbonates, sulfites, borates, carboxylates and phosphates.

The novel quaternary diester salt is prepared by reacting an alkenyl-succinic anhydride with a haloalcohol, employing a mole ratio of one mole of an alkenylsuccinic anhydride with two or more moles of a halogenated monohydric alcohol in the presence of an acid-reacting catalyst followed by a reaction with a heterocyclic tertiary amine to produce the prescribed quaternary ammonium salt.

The dispersant detergent lubricating oil composition of the invention comprises a lubricating oil base and an effective amount of the prescribed quaternary ammonium salt.

DESCRIPTION OF THE PREFERRED EMBODIMENTS

The quaternary ammonium salt of a diester of this invention is represented by the formula:

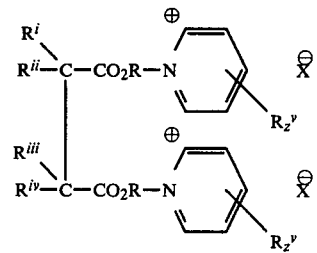

in which $R^i$, $R^{ii}$, $R^{iii}$ and $R^{iv}$ represent hydrogen, alkyl or alkenyl radicals at least one of which is a hydrocarbyl radical having from 50-200 carbon atoms, R is a divalent radical having from 2-10 carbon, or carbon and oxygen atoms, $R^v$ is hydrogen or a hydrocarbyl radical, Z has a valve from 0-4 and X is an anion selected from the group consisting of halides, sulfates, carbonates, sulfites, borates, carboxylates, and phosphates.

In the above formula, the divalent radical represented by R can be an aliphatic hydrocarbon radical or it can be an ether or a polyether radical represented by the formulas:

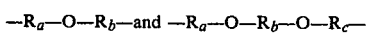

wherein $R_a$, $R_b$ and $R_c$ are aliphatic hydrocarbon radicals having from 2 to 4 carbon atoms each.

The hydrocarbon radical represented by $R^v$ in the above formula can be an aliphatic hydrocarbon radical or an aromatic radical, or one or two pairs of $R^v$ can be interconnected to form one or two fused aromatic rings respectively with the principal heterocyclic aromatic ring.

When X is a halogen atom it is preferably a chloride or a bromide ion.

A preferred quaternary ammonium diester salt is represented by the formula:

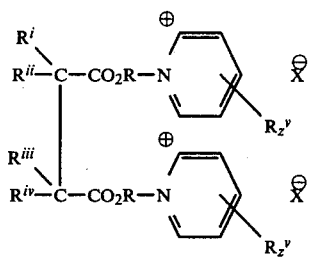

in which $R^i$ is a hydrocarbyl radical having from 50 to 200 carbon atoms; $R^{ii}$, $R^{iii}$ and $R^{iv}$ are hydrogen atoms, R is a divalent hydrocarbon radical having from 2 to 6 carbon atoms, X is an anion selected from the group consisting of chloride, bromide, sulfate and borate ions, $R^v$ is hydrogen or an aliphatic hydrocarbon radical having from 1 to 3 carbon atoms and z has a value from 0–2.

The prescribed quaternary ammonium diester salt of the invention is prepared in a two-step reaction. In general, an alkenyl succinic anhydride is reacted with a halogenated alcohol in the presence of an acid-reacting catalyst to produce the intermediate diester. This, in turn, is reacted with a heterocyclic tertiary amine to produce the quaternary ammonium salt of the diester.

Numerous methods for the preparation of alkenylsuccinic acid anhydrides are known to those skilled in the art. In general, an alkenylsuccinic acid anhydride can be prepared by heating a polyolefin of suitable molecular weight with maleic anhydride to produce an alkenylsuccinic acid anhydride. The polyolefin employed in this reaction is one obtained from the polymerization of a $C_2$ to $C_6$ monoolefin or a mixture of monoolefins under conventional polymerization conditions. The polymer produced will be an unsaturated polymer having a molecular weight corresponding to the desired molecular weight of the alkenyl radical in the prescribed quaternary ammonium diester salt, i.e., a molecular weight from about 700 to 2800 as determined by vapor pressure osmometry.

The alkenylsuccinic acid anhydrides that are particularly suited for preparing the quaternary ammonium diester salt of the invention are those prepared by reacting a polyolefin with maleic anhydride in the presence of a brominated compound inhibitor or catalyst. This is an essential feature in the preparation of the intermediate diester which is the precursor to the prescribed quaternary ammonium diester salt. Suitable brominated compound inhibitors or catalysts for the polyolefin-maleic anhydride reaction include 1,3-dibromo-5,5-dimethylhydantoin, brominated phenols, such as 2,4,6-tribromophenol, pentabromophenol, tetrabromoorthocresol, 1,6-dibromo-2-naphthol, and tetrabromohydroquinone, brominated alkanols, such as 1,3-dibromopropanol, 4-bromobutanol, 2-bromoethanol, 6-bromohexanol, 3-bromo-2,2-dimethyl-1-propanol and the like. This reaction is described in the following U.S. Patents, namely, U.S. Pat. Nos. 3,927,041; 3,985,672 and 4,086,251, the disclosures of which are incorporated herein by reference.

Examples of specific alkenyl-substituted succinic acid anhydrides which can be employed for preparing the prescribed quaternary ammonium diester salts of this invention include the following: polybutenyl-, polypropenyl- and polypentenyl- succinic acid anhydrides.

The haloalkanol, which can be employed for preparing the intermediate diester salt, is represented by the formula X—R—OH in which X is a halogen atom and R is a divalent radical having from 2 to 10 carbon, or carbon and oxygen atoms. The halogen atom can be a chloride, bromide or an iodide atom, with the chloride atom being preferred. Typical examples of suitable haloalkanol compounds include 2-chloroethanol, 2-bromoethanol, 3-chloropropanol, 3-bromopropanol, 4-chlorobutanol, 4-bromobutanol, 4-iodobutanol, 5-chloropentanol, 5-bromopentanol, 6-chlorohexanol, 6-bromohexanol, and 2-(2-chloroethoxy)-ethanol.

The mole ratio of haloalkanol to alkenylsuccinic anhydride which can be used to prepare the intermediate product necessary in the reaction leading to the prescribed quaternary ammonium salt of a diester is from 2.0 to 10.0 moles of haloalkanol to 1 mole of alkenylsuccinic anhydride with the preferred ratio being from 2.0 to 2.5 moles of the haloalkanol to a mole of alkenylsuccinic anhydride. The lower mole ratio of 2 moles of haloalkanol to 1 mole of the anhydride is a critical limitation in the process leading to the preparation of the prescribed diester salts. High mole ratios of the haloalkanol have no significant effect on the amount of the intermediate product produced.

The reaction of an alkenylsuccinic anhydride with a haloalkanol to form the diester precursor of the prescribed quaternary ammonium diester salt must be conducted either concurrently or sequentially in the presence of an acid-reacting catalyst. This catalyst serves to promote the esterification reaction. Suitable acid-reacting catalysts include sulfuric acid, phosphoric acid, polyphosphoric acid, sulfonic acid, p-toluene sulfonic acid, phosphonic acid, hydrogen chloride, hydrogen bromide, sulfonated cation exchange resins and crystalline alumino-silicate in the acid form.

The amount of the acid-reacting catalyst used is not critical. In general, from about 0.2 to 5.0 weight percent of the acid-catalyst based on the amount of the alkenylsuccinic acid anhydride will promote the ester reaction.

This reaction can be conducted over a broad range of temperatures. Useful temperatures range from about 20° to 150° C. with the preferred reaction temperature being from about 80° to 120° C.

The intermediate diester product produced in the first step of this process leading to the prescribed quaternary ammonium salt is represented by the formula:

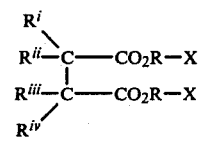

in which R, $R^i$, $R^{ii}$, $R^{iii}$, $R^{iv}$ and X have the same values noted above for the finished salt.

The intermediate diester product is reacted with a tertiary heteroaromatic amine in order to form the prescribed quaternary ammonium salt. The effective tertiary heteroaromatic amine is represented by the formula:

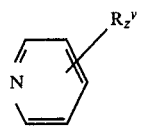

in which z is a number from 0 to 4 and $R^y$ is hydrogen, or a hydrocarbyl radical having from 1 to 8 carbon atoms, or one or two pairs of "R"s are interconnected to form one or two fused aromatic rings respectively.

The preferred heteroaromatic amine is one in which $R^y$ is hydrogen or a lower aliphatic hydrocarbon radical having from 1 to 4 carbon atoms.

Examples of suitable tertiary heteroaromatic amines include pyridine, 2-methylpyridine, 2,3-dimethylpyridine, 4-methylpyridine, quinoline, isoquinoline and phenazine.

The following procedure, Procedure A describes the method that was employed for preparing the diester intermediate used in the preparation of the prescribed quaternary ammonium salt compounds of this invention.

Procedure A

A polyisobutenyl (about 1300 molecular weight) succinic anhydride, the haloalcohol and the acid catalyst are charged to an appropriate sized flask equipped with a reflux condenser, stirrer and thermometer. The mixture is heated at the specified temperature for the indicated time period. The reflux condenser is removed and a distillation head is installed after which the mixture is further heated at 120°–130° C. under reduced pressure in order to remove small amounts of volatile materials (primarily unreacted alcohol) and to complete formation of the product. The product is then subjected to infrared analysis. Ester formation is indicated by a strong absorption at the 1770 cm$^{-1}$ wavelength.

The following Table gives the details of preparation and the results obtained in Examples 'through 9 for the diester intermediate product.

EXAMPLES 10–19

The prescribed quaternary ammonium diester salts of this invention were prepared by one of the following procedures.

The appearance of the additive can often be beneficially modified by conducting the ester/amine reaction in the presence of a base to neutralize amine hydrochloride and/or boric acid to minimize color body formation. In addition, it will be appreciated that the performance and/or appearance of the additive can often be beneficially modified by exchanging the halide in the compound with another anion, such as a borate, sulfate, phosphate, phosphonate, sulfite or sulfonate, disclosed above. In general, the original quaternary ammonium diester salt is mixed with an acidic compound having the desired anion prescribed herein above and reacted therewith at a moderately elevated temperature ranging from about 80° to 120° C., while removing the displaced hydrogen halide under reduced pressure. The resulting modified salt is significantly improved as a lubricating oil additive.

Procedure B

The diester, the tertiary amine and the other reagent (if used) are charged to a reactor vessel and stirred under a nitrogen atmosphere at the specified temperature for the indicated period of time. The mixture is diluted with oil and the resulting solution stripped at 90°–150° C. under a 0.1–25 mm Hg vacuum to remove unreacted amine. After stripping, the mixture is filtered through diatomaceous earth to yield an oil concentrate of the product.

Procedure C

The reaction product obtained according to Procedure B (100 parts) was combined with boric acid (10 parts). The resulting mixture was stirred under a nitrogen purge at 100° for 1.0 hour and then filtered through diatomaceous earth to yield an oil concentrate of the product. This treatment removed the amine-like odor from the additive.

Procedure D

The reaction product obtained according to Procedure B (100 parts) is diluted with a light hydrocarbon (heptane or isooctane, 200 parts) and the resulting solu-

TABLE I

| | INTERMEDIATE DIESTER | | | | | | | |
|---|---|---|---|---|---|---|---|---|
| | REACTANTS | | | | | ANALYSIS OF PRODUCT | | |
| | Moles of Polyisobutenyl (1300 m.w.) Succinic Anhydride[1] | Moles of Haloalkenol[2] | Moles of Sulfuric Acid | Procedure | Mole Ratio Anh./Alc./Acid | Reaction Conditions | | |
| Example | | | | | | Temp. °C. | Time Hr. | % Chlorine |
| 1 | 0.10 | 0.65 | 0.01 | A | 1.0-6.3-0.1 | 85 | 4.0 | 3.2 |
| 2 | 1.41 | 3.49 | 0.17 | A | 1.0-2.5-0.12 | 80 | 1.5 | 3.2 |
| 3 | 0.44 | 1.00 | 0.05 | A | 1.0-2.3-0.11 | 80 | 1.0 | 3.0 |
| 4 | 30.7 | 67.5 | 3.4 | A | 1.0-2.2-0.11 | 80 | 1.0 | 2.9 |
| 5 | 1.16 | 2.42 | 0.12 | A | 1.0-2.1-0.1 | 80 | 1.5 | 2.8 |
| 6 | 1.14 | 2.28 | 0.11 | A | 1.0-2.0-0.1 | 80 | 1.0 | 3.0 |
| 7 | 0.40 | 0.80 | 0.04 | A | 1.0-2.0-0.1 | 80 | 0.5 | 2.7 |
| 8 | 0.067 | 0.17 | 0.007 | A | 1.0-2.5-0.1 | 80 | 2.0 | 2.6 |
| 9 | 0.15 | 0.30 | 0.015 | A | 1.0-2.0-0.1 | 80 | 1.0 | 2.8 |

[1]The saponification number for the anhydride in Examples 1-9 was 58. The mole of anhydride group was calculated from the saponification number.
[2]4-Chlorobutanol was used in Examples 1-7, 3-chloropropanol in Example 8, 2-(2-chloroethoxy)-ethanol in Example 9.

tion was extracted with methanol (100 parts). The methanol layer is allowed to separate and was then removed from the vessel and discarded. The remaining light hydrocarbon solution was stripped at 90°-100° C. under a 1-25 mm Hg vacuum to yield an oil concentrate of the product.

Procedure E

The ester and the tertiary amine are charged to an appropriately sized flask equipped with a reflux condenser, stirrer, nitrogen inlet tube, and thermometer. The mixture is stirred and heated under a nitrogen atmosphere at the specified temperature for the indicated time period. The mixture is diluted with a light hydrocarbon, (heptane or isooctane) and a measured amount of mineral oil, filtered through diatomaceous earth, and then stripped at 90°-100° C. under a vacuum of from 1-25 mm of mercury to remove the light hydrocarbon and the unreacted amine and yield of an oil concentrate of the product.

The reactants, reaction parameters and product analyses for Examples 10 through 19 are summarized in Table II below:

concentrates between about 50 and 90 weight percent of the composition. It is to be noted that even in the lubricating oil concentrates the prescribed quarternary ammonium diester salt will exhibit detergent-dispersancy as well as varnish inhibition.

Examples of the hydrocarbon base oils contemplated herein are the naphthenic base, paraffinic base and mixed base mineral oils, lubricating oils derived from coal products and synthetic oils, e.g., alkylene polymers such as polypropylene and polyisobutylene of a molecular weight of between about 250 and 2500. Advantageously, a lubricating base oil having a lubricating oil viscosity at 100° F. of between about 50 and 1000, preferably between about 100 and 600, are normally employed for the lubricant compositions and concentrates thereof. (SUS basis)

In the contemplated finished lubricating oil compositions other additives may be included in addition to the dispersant of the invention. The additives may be any of the suitable standard pour depressants, viscosity index improvers, oxidation and corrosion inhibitors, anti-foamants, supplementary detergent-dispersants, etc. The choice of the particular additional additives to be in-

TABLE II

| Ex. No. | Diester Ex. No. in TABLE I | Gr. | Tertiary Amine Identity | Grams | Mole Ratio Amine/Chloride in Diester | Prep. Procedure[1] | Other Reactants | Amt. (Gr.) | Product Analyses[2] % Chloride | % Nitrogen | % Other |
|---|---|---|---|---|---|---|---|---|---|---|---|
| 10 | 4 | 500 | 4-Picoline | 239 | 6.3 | B | None | — | 1.3 | 0.46 | |
| 11 | 4 | 500 | 4-Picoline | 239 | 6.3 | B | Zinc Carbonate | 12.5 | 1.4 | 0.30 | |
| 12 | 4 | 500 | 4-Picoline | 239 | 6.3 | B | Zinc Oxide | 10.0 | | 0.33 | |
| 13 | 4 | 500 | 4-Picoline | 239 | 6.3 | B | Sodium Carbonate | 45.0 | 1.2 | 0.43 | |
| 14 | 4 | 500 | 4-Picoline | 239 | 6.3 | B | Boric Acid | 40.0 | 1.3 | 0.64 | 0.65B |
| 15 | 4 | 500 | 4-Picoline | 239 | 6.3 | B | Sodium Borate | 40.0 | 1.2 | 0.35 | |
| 16 | 6 | 1004 | 4-Picoline | 401 | 5.1 | C | None | — | 1.3 | 0.36 | |
| 17 | 2 | 1000 | 4-Picoline | 532 | 6.3 | D | None | — | 0.98 | 0.40 | |
| 18 | 8 | 91 | 4-Picoline | 48 | | E | None | — | 1.14 | 0.45 | |
| 19 | 9 | 200 | 4-Picoline | 62 | 4.2 | E | None | — | 1.3 | 0.52 | |

[1]Examples through 18 were reacted at k30° C. for 6.0 hours; Example 19 was conducted at 130° C. for 8 hours.
[2]Example 17 contained 56% diluent oil in the product, all of the other Examples contained 50% diluent oil.

EXAMPLE 20

A portion of a product prepared as in Example 15 (2710 gr.) and having 1.29% Cl, 0.54% N and 0.20% B was combined with 94.6 gr. of concentrated sulfuric acid. The resulting mixture was heated at 60° C. (1 mm) for six hours in order to remove hydrogen chloride. The mixture was filtered while hot to yield a product which had 0.22% CL, 0.29% N and 0.97% S.

The lubricant composition of the invention comprises a major amount of a mineral, hydrocarbon oil or synthetic oil of lubricating viscosity and an effective detergent-dispersant amount of the prescribed quaternary ammonium salt of a diester. Advantageously, in the finished lubricating oil composition, the prescribed quarternary ammonium diester salt content ranges between about 0.1 and 10 percent by weight, preferably between about 0.5 and 5 weight percent. In the lubricating oil concentrates, from which the finished lubricating compositions are derived via the addition of added lubricating oil, quaternary ammonium diester salt contents between about 10 and 50 weight percent are found.

The hydrocarbon oil in the finished lubricating composition advantageously constitutes at least about 85 weight percent and preferably between about 90 and 98 weight percent of the composition, and in the lube oil cluded in the finished oils and the particular amounts thereof will depend on the use and conditions desired for the finished oil product.

Specific examples of the supplementary additives are as follows:

A widely used and suitable VI improver is the polymethacrylate having the general formula:

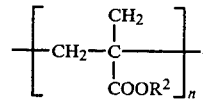

where R2 is an aliphatic radical of from 1 to 20 carbons and n is an integer of between about 600 and 35,000. One of the most suitable VI improvers is the tetrapolymer of butyl methacrylate, dodecyl methacrylate, octadecyl methacrylate, and dimethylaminoethyl methacrylate having a respective component weight ratio in the polymer of about 4:10:5:1. Another VI improver is a copolymer of ethylene and propylene having a molecular weight of 20,000 to 50,000 containing 30 to 40 percent propylene in the copolymer in admixture with solvent neutral oil (100 E Pale Oil) comprising 13 weight percent copolymer and 87 weight percent oil.

The VI improvers are normally empolyed in the finished lubricant compositions in quantities between about 0.1 and 10 percent by weight.

One of the commonly employed lube oil corrosion inhibitors and antioxidants are the divalent dialkyl dithiophosphates resulting from the neutralization of a $P_2S_5$-alcohol reaction product with a divalent metal or divalent metal oxide. Barium and zinc dialkyl dithiophosphate are specific examples. Another class of antioxidants are the polyalkylated diphenylamines, such as a mixture of 2,2'-diethyl-4,4'-dioctyldiphenylamine and 2,2'-diethyl-4-octyldiphenylamine. The corrosion and oxidation inhibitors are usually present in the finished lubricating oil compositions in concentrations of between about 0.1 and 3 weight percent.

Examples of supplementary detergent-dispersants which can be employed are the monoethoxylated inorganic phosphorus acid-free, steam hydrolyzed polyalkylene (500–50,000 m.w.)-$P_2S_5$ reaction product, alkaline earth metal alkylphenolates, such as barium nonylphenolate, barium dodecylcresolate, calcium dodecylphenolate and the calcium carbonate overbased calcium alkaryl sulfonates formed by blowing a mixture of calcium hydroxide and calcium alkaryl sulfonate, e.g., calcium alkylbenzene sulfonate of about 900 m.w. with carbon dioxide to form a product having a total base number (TBN) of 50 or more, e.g., 300 to 400.

If antifoamants are employed in the finished compositions, one widely used class which is suitable are the dimethyl silicone polymers employed in amounts of between about 10 and 1000 ppm.

The following tests were employed to determine the dispersancy and varnish inhibiting effect of the lubricant composition of the invention:

BENCH VC TEST

In the Bench VC Test, a mixture containing the test oil and a diluent are heated at an elevated temperature. After heating, the turbidity of the resultant mixture is measured. A low % turbidity (0–10) is indicative of good dispersancy while high results (20–100) are indicative of oils of increasingly poor dispersancy.

FORD SEQUENCE VC TEST

This test is the Ford Sequence VC Test and is detailed in "Multicylinder Test Sequence for Evaluating Automotive Engine Oils" ASTM Special Technical Publication under 315-E. This procedure is used to evaluate crankcase motor oils with respect to sludge and varnish deposits as well as their ability to keep the positive crankcase ventilation (PCV) valve clean and functioning properly. Ratings of 0 to 10 are given, 10 representing absolutely clean and 0 rating representing heavy sludge and varnish deposits and a clogged PCV valve. SE performance criteria for the test specify a 8.5 (min.) for average sludge, 8.0 (min.) for average varnish and 7.9 (min.) for piston skirt varnish.

EXAMPLE 21

A fully formulated SAE Grade 10W-40 lubricating oil composition containing the quaternary ammonium salt of a diester of the invention was tested for its dispersing effectiveness in the Bench VC Test in comparison to a fully formulated base oil without the amine salt dispersant, and to fully formulated lubricating oil compositions containing either a commercial succinimide dispersant or the intermediate diester.

The base blend employed contained the following conventional additives:

0.15 weight % zinc as zinc dialkyldithiophosphate
0.23 weight % calcium as overbased calcium sulfonate
0.25 weight % alkylated diphenylamine antioxidant
11.5 weight % ethylene-propylene copolymer VI improver
0.15 weight % ethoxylated alkylphenol
0.10 weight % methacrylate pour depressant
150 ppm silicone antifoamant
mineral oil—balance The quaternary ammonium diester salt dispersant of the invention was added to the base blend at two concentrations on an oil-free basis and then tested in the Bench VC Test.

The results are set forth in the table below:

TABLE III

| Run | BENCH VC TEST Wt. % of Additive in Base Blend | Turbidity |
|---|---|---|
| 1 | Base Blend (no dispersant) | 97.5 |
| 2 | Example 10 - 4.0 | 3.0 |
| 3 | Example 10 - 3.0 | 3.5 |
| 4 | Example 11 - 4.0 | 4.5 |
| 5 | Example 11 - 3.0 | 3.5 |
| 6 | Example 12 - 4.0 | 3.5 |
| 7 | Example 12 - 3.0 | 4.5 |
| 8 | Example 13 - 4.0 | 2.0 |
| 9 | Example 13 - 3.0 | 2.0 |
| 10 | Example 14 - 4.0 | 2.0 |
| 11 | Example 14 - 3.0 | 3.0 |
| 12 | Example 15 - 4.0 | 2.0 |
| 13 | Example 15 - 3.0 | 2.5 |
| 14 | Example 16 - 4.0 | 3.0 |
| 15 | Example 16 - 3.0 | 5.0 |
| 16 | Example 17 - 4.0 | 1.5 |
| 17 | Example 17 - 3.0 | 3.5 |
| 18 | Example 18 - 4.0 | 3.5 |
| 19 | Example 18 - 3.0 | 3.5 |
| 20 | Example 19 - 4.0 | 3.5 |
| 21 | Example 20 - 4.0 | 3.5 |
| 22 | Example 20 - 3.0 | 3.5 |
| 23 | Succinimide Dispersant - 4.0 | 4.0 |
| 24 | Succinimide Dispersant - 3.0 | 9.5 |
| 25 | Diester Example 4 - 4.0 | 97.0 |
| 26 | Diester Example 4 - 3.0 | 97.5 |

The foregoing tests demonstrate that the prescribed quaternary amine salts of diesters are excellent dispersants for a lubricating oil composition and exhibit superior effectiveness in comparison to a commercial succinimide dispersant.

EXAMPLE 22

This example illustrates the dispersant properties of the lubricating oil compositions of the invention in the Ford Sequence VC Test described above. The base blend employed in the tests was formulated SAE Grade 10W-40 mineral lubricating oil composition. The composition of the lubricant and the test results are set forth in the table below:

TABLE IV

| Composition | Wt. % |
|---|---|
| Dispersant of Example 16 | 6.00 |
| 0.15% zinc as zinc dialkyldithiophosphate | 1.36 |
| 0.23% calcium as overbased calcium sulfonate | 1.53 |
| Dinonyldiphenylamine | 0.25 |
| Methacrylate ester | 0.10 |
| Ethylene propylene copolymer (20,000 to 50,000 mm) | 1.50 |
| Silicone antifoamant | 150 ppm |
| Mineral oil | 89.26 |

TABLE IV-continued

SEQUENCE VC TEST RESULTS

| | |
|---|---|
| Sludge (Average) | 9.1 |
| Varnish (Average) | 8.4 |
| Piston Skirt Varnish | 7.9 |

The foregoing test results indicate outstanding engine cleanliness for the lubricating oil composition of the invention in the Ford Sequence VC Engine Test.

We claim:

1. A quaternary ammonium diester salt composition represented by the formula:

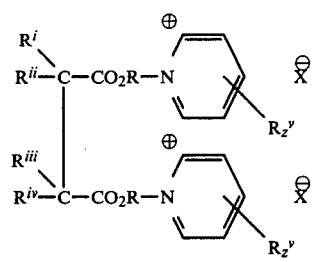

in which $R^i$, $R^{ii}$, $R^{iii}$ and $R^{iv}$ represent hydrogen, alkyl or alkenyl hydrocarbyl radicals at least one of which is a hydrocarbyl radical having from 50-200 carbon atoms, R is a divalent radical having from 2-10 carbon, or carbon and oxygen atoms, $R^v$ is hydrogen or a hydrocarbyl radical, z has a value from 0-4 and X is an anion selected from the group consisting of halides, sulfates, carbonates, sulfites, borates, carboxylates, and phosphates.

2. A quaternary ammonium diester salt according to claim 1 in which R is a divalent hydrocarbon radical having from 2 to 6 carbon atoms and $R^v$ is hydrogen or an alkyl radical having from 1 to 3 carbon atoms.

3. A quaternary ammonium diester salt according to claim 1 in which the hydrocarbyl radical represented by $R^i$, $R^{ii}$, $R^{iii}$ or $R^{iv}$ has from 75 to 150 carbon atoms.

4. A quaternary ammonium salt according to claim 1 in which said anion is the chloride ion.

5. A quaternary ammonium salt according to claim 1 in which said anion is the sulfate ion.

6. A quaternary ammonium salt according to claim 1 in which said anion is a borate ion.

7. A quaternary ammonium diester salt composition represented by the formula:

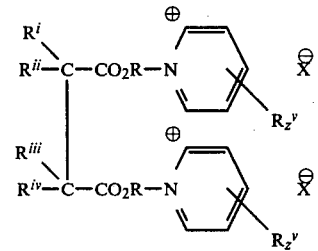

in which $R^i$ represents a hydrocarbyl radical having from 50 to 200 carbon atoms, $R^{ii}$, $R^{iii}$ and $R^{iv}$ represent hydrogen or methyl radicals, R is a divalent hydrocarbon radical having from 2 to 6 carbon atoms, X is an anion selected from the group consisting of chloride, bromide, sulfate and borate ions, $R^v$ is hydrogen or an aliphatic hydrocarbon radical having from 1 to 3 carbon atoms and z has a value from 0 to 2.

8. A quaternary ammonium diester salt according to claim 7 in which the hydrocarbyl radical represented by $R^i$ has from 75 to 150 carbon atoms.

9. A quaternary ammonium diester salt according to claim 8 in which the hydrocarbyl radical represented by $R^i$ is a polyisobutenyl radical.

10. A quaternary ammonium diester salt according to claim 7 in which R is a divalent hydrocarbon radical having from 2 to 4 carbon atoms and $R^v$ is hydrogen or a methyl radical.

11. A quaternary ammonium salt according to claim 7 in which said anion is the chloride ion.

12. A quaternary ammonium salt according to claim 7 in which said anion is a borate ion.

13. A lubricating oil composition comprising a major portion of a mineral lubricating oil and a minor dispersant amount of a quaternary ammonium diester salt composition represented by the formula:

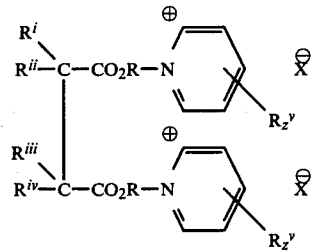

in which $R^i$, $R^{ii}$, $R^{iii}$ and $R^{iv}$ represent hydrogen, alkyl or alkenyl hydrocarbyl radicals at least one of which is a hydrocarbyl radical having from 50-200 carbon atoms, R is a divalent radical having from 2-10 carbon, or carbon and oxygen atoms, $R^v$ is hydrogen or a hydrobarbyl radical, z has a value from 0 to 4, and X is an anion selected from the group consisting of halides, sulfates, carbonates, sulfites, borates, carboxylates, and phosphates.

14. A lubricating oil composition according to claim 13 having a quaternary ammonium diester salt in which R is a divalent hydrocarbon radical having from 2 to 6 carbon atoms and $R^v$ is hydrogen or an alkyl radical having from 1 to 3 carbon atoms.

15. A lubricating oil composition according to claim 13 having a quaternary ammonium diester salt in which the hydrocarbyl radical represented by $R^i$ has from 75 to 150 carbon atoms.

16. A lubricating oil composition according to claim 13 having a quaternary ammonium diester salt in which said anion is the chloride ion.

17. A lubricating oil composition according to claim 13 having a quaternary ammonium diester salt in which said anion is the sulfate ion.

18. A lubricating oil composition according to claim 13 having a quaternary ammonium diester salt in which said anion is a borate ion.

19. A lubricating oil composition comprising a major portion of a mineral lubricating oil and a minor dispersant amount of a quaternary ammonium diester salt, composition represented by the formula:

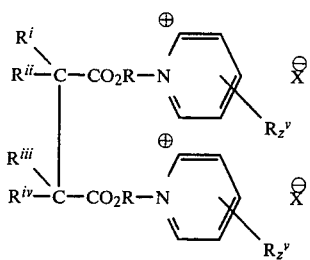

in which $R^i$ represents a hydrocarbyl radical having from 50 to 200 carbon atoms, $R^{ii}$, $R^{iii}$ and $R^{iv}$ represent hydrogen or methyl radicals, R is a divalent hydrocarbon radical having from 2 to 6 carbon atoms, X is an anion selected from the group consisting of chloride, bromide, sulfate and borate ions, $R^v$ is hydrogen or an aliphatic hydrocarbon radical having from 1 to 3 carbon atoms and z has a value from 0 to 2.

20. A lubricating oil composition according to claim 19 having a quaternary ammonium diester salt in which the hydrocarbyl radical represented by $R^i$ has from 75 to 150 carbon atoms.

21. A lubricating oil composition according to claim 19 having a quaternary ammonium diester salt in which the hydrocarbyl radical represented by $R^i$ is a polyisobutenyl radical.

22. A lubricating oil composition according to claim 19 having a quaternary ammonium diester salt in which R is a divalent hydrocarbon radical having from 2 to 6 carbon atoms and $R^v$ is hydrogen or an alkyl radical having from 1 to 3 carbon atoms.

23. A lubricating oil composition according to claim 19 having a quaternary ammonium salt in which said anion is the chloride ion.

24. A lubricating oil composition according to claim 19 having a quaternary ammonium salt in which said anion is a borate ion.

25. A method for preparing a quaternary ammonium diester salt composition which comprises reacting a polyolefin having from about 50 to 200 carbon atoms, with maleic anhydride in the presence of a brominated compound to produce an alkenylsuccinic acid anhydride in which said alkenyl radical has from about 50 to 200 carbon atoms reacting said alkenylsuccinic acid anhydride with a haloalcohol represented by the formula X—R—OH in which R is a divalent radical having from 2 to 10 carbon, or carbon and oxygen atoms in the presence of an acid reacting catalyst employing a mole ratio of 2 to 10 moles of said haloalcohol per mole of said anhydride to produce an intermediate diester product and reacting said intermediate diester product with a tertiary amine represented by the formula:

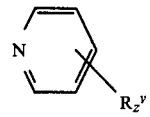

in which $R^v$ is hydrogen or a hydrocarbyl radical having from 1 to 3 carbon atoms and z has a value from 0 to 4.

26. A method according to claim 25 in which said alkenyl radical has from about 75 to 150 carbon atoms.

27. A method according to claim 25 in which said haloalcohol is 2-chloroethanol and said tertiary amine is 4-picoline.

28. A method according to claim 25 in which said haloalcohol is 4-chlorobutanol and said tertiary amine is 4-picoline.

29. A method according to claim 25 in which said acid reacting catalyst is sulfuric acid.

30. A method according to claim 25 in which the mole ratio of said haloalcohol to said anhydride is from 2 to 2.5.

31. A method according to claim 25 in which said quaternary ammonium diester salt is further reacted with an acid selected from the group consisting of sulfuric acid, carbonic acid, sulfurous acid, boric acid, carboxylic acids and phosphoric acid.

32. A method according to claim 25 in which said brominated compound is a brominated hydantoin, brominated phenol or brominated alkanol.

33. A method according to claim 25 in which the reaction of the intermediate diester with the tertiary amine is conducted in the presence of a small amount of boric acid and/or base.

* * * * *